Patented Mar. 14, 1933

1,901,222

UNITED STATES PATENT OFFICE

JOHN TREADWELL BULLWINKEL, OF BROOKLYN, NEW YORK, ASSIGNOR TO THE PHOSPHATE MINING CO., OF NEW YORK, N. Y., A CORPORATION OF NEW YORK

TREATMENT OF PHOSPHATE ROCK

No Drawing.   Application filed April 17, 1931. Serial No. 531,012.

This invention relates to the treatment of phosphate rock, and particularly pebble phosphate, whereby the quality of the rock is improved. More particularly, the invention relates to an improved process of treating pebble phosphate to remove, before drying, the last remaining admixed and adhering clay and sand without resorting to additional scrubbing process which ordinarily would be necessary for this purpose in the washing of phosphate rock.

Pebble phosphate and other phosphates are found in a matrix of sand and clay in varying percentages. In order to recover the phosphate from the matrix the matrix must be distintegrated and the disintegrated material must then be treated to separate the phosphate as much as possible from the clay and sand.

The common method of mining and disintegration of pebble phosphate is by the use of hydraulic guns, which disintegrate the matrix at the same time that the hydraulic mining operation is carried out. The disintegrated matrix is then subjected to a series of scrubbing, screening and washing operations to remove the clay and sand as much as possible from the phosphate. The greater part of the sand and clay can be removed without difficulty, but complete removal of clay balls, clay and such sand as is held by the clay, is hard to accomplish without additional scrubbing and substantial loss of otherwise recoverable phosphate values. The clay and sand are present in the disintegrated matrix to a substantial extent in the form of so-called clay balls, which, in the ordinary treatment of the disintegrated matrix must be worn down or disintegrated to a size such that water will carry the clay and freed sand through the fine screens on which phosphate values are retained. So-called sand rock may also be present admixed with the pebble phosphate and similarly requires wearing down or disintegration to remove it from the phosphate.

The production of a clean, clay-free product from the ordinary washing process of treating pebble phosphate requires complete distintegration of the clay and clay-balls as well as freeing the sand particles that cling to the phosphate pebbles because of clay. The common method of disintegration is by means of scrubbers or crushers or special log washers, which are effective for bringing about the desired disintegration of the clay and sand but which have the objection that such scrubbing treatment wears down the phosphate pebbles at the same time with resulting loss of phosphate values.

The scrubbing action of logs, scrubbers or crushers, required to wear down or disintegrate the clay balls and particles of soft sand rock and free the clay which adheres to the phosphate pebbles is a harsh action which causes a substantial loss of phosphate and particularly of the softer phosphate pebbles which are easily crushed and disintegrated and which are frequently of higher grade. If the scrubbing action which is required to completely eliminate the clay balls is reduced for the purpose of conserving the phosphate values then the final phosphate product is contaminated by such clay balls and soft sand rock as are not completely disintegrated. The phosphate producer must choose between a product containing some contamination from clay balls, clays and adhering sands or sufficient scrubbing action to permit of elimination of clay balls and sands with consequent loss of phosphate. The first choice involves an economic loss of quality and the second an economic loss of quantity and, if soft phosphate pebbles are present, also of quality. The presence of clay and sand in even small amount lowers the grade of the phosphate rock. The object is to produce phosphate rock containing as little sand and clay as possible. Lower grades of phosphate rock are sold at lower prices. The presence of clay even in small amounts causes trouble in some processes for which phosphate rock is the raw material.

I have found that the disintegration of clay balls, clays and adhering sands and soft sand rock which are usually found in the phosphate product after the usual common scrubbing, washing and screening process, can be very easily accomplished without subjecting the phosphate product to additional harsh scrubbing treatment, by subjecting the phosphate, while it still contains adhering to or admixed therein the before mentioned clay balls, clay, or sand, to a soaking treatment for a considerable period of time before completing the washing operation.

I have found that pebble phosphate which contains small amounts of adhering clay and sand and of clay balls or soft sand rock can be further purified and a higher grade of rock obtained, without objectionable attrition and loss of phosphate, by permitting the rock to stand in a wet condition for a considerable period of time, for example, from six to twenty-four hours, and that such soaking operation effectively disintegrates the clay balls and soft sand rock and adhering clay and sand so that they can be readily removed from the phosphate rock by a simple rinsing and screening treatment.

The present process involves an interruption in the ordinary continuous method of scrubbing and washing and drying phosphate rock and the holding of the material in a moist condition for a considerable period of time before the washing treatment of the rock is finally completed. The present process is discontinued after the greater part of the sand and clay have been washed from the disintegrated material, but before the phosphate pebbles have been subjected to the usual final screening and storage in the wet bins. By taking the wet phosphate material directly after the washing and screening process to which it has been subjected for the purpose of freeing the phosphate pebbles from most of the sand and clay with which they occur in nature and placing it in a soaking bin or in a place where it is permitted to stand and soak for a period sufficiently long to disintegrate the clay balls and clay and soft sand rock, such disintegration would occur with the water ordinarily present in the material, and the material can then be subjected to a further rinsing treatment and screening without the necessity of a scrubbing treatment or objectionable attrition or disintegration of the phosphate material. The soaked and disintegrated clay and sand after the soaking treatment, can be conveyed to such equipment as a classifier or other equipment where it undergoes a thorough rinsing, and then over screens where the clean pebbles are separated, and finally to wet storage or to the drying operation.

I have found that the interruption in the ordinary process and the soaking treatment does not necessarily have to be in the ordinary scrubbing and screening process but can be advantageously made at any point during the usual operation provided it is done before the phosphate pebbles are dried and while they are still wet.

This interruption and soaking treatment may be conveniently carried out by holding the phosphate pebbles in the usual wet bins, soaking bins, or in wet storage provided the material is permitted to soak for a period sufficiently long to disintegrate the clay balls and clay and soft sand rock, after which the phosphate pebbles are then subjected to a rinsing and screening treatment to further purify the phosphate pebbles by the elimination of the disintegrated clays, etc., without the necessity of using the common harsh treatment of logs, scrubbers or crushers.

Without this interruption of the process and soaking treatment over a considerable period of time it would be necessary to use additional equipment, such as logs, crushers or scrubbers for the complete disintegration of the clay, clay balls and soft sand rock so that classifiers or other rinsing treatment and screens would eliminate the freed clay and sand. But when the process is interrupted and the materials subjected to the soaking treatment, the clay balls, soft sand rock and clay are disintegrated without such objectionable mechanical handling and treatment and without the crushing or eroding action which such apparatus causes and without the loss of phosphate resulting therefrom.

I have found that a period of a few hours to twenty-four hours will ordinarily be sufficient for the disintegration of the usual clay balls and soft sand rock and adhering clay and sand but that a longer period of time may be used if convenient without disadvantage.

The action which takes place during the soaking treatment appears to be a gentle disintegration by slow penetration of water into the clay and sand rock so that it becomes softened or disintegrated without special attrition or scrubbing treatment.

Even with pebble phosphate material which has undergone the complete present day method of disintegration and washing, and which still contains one or two percent or more of clay, usually in the form of clay balls, the further treatment of such material by subjecting it while wet to a soaking treatment, and then to a further washing to wash away the disintegrated clay, will improve the quality or grade of the phosphate pebbles so that they will command a higher price and be available for uses where even small amounts of admixed clay are objectionable. But it is not necessary to carry out the present disintegrating and washing treatment to such an extent that only around one or two percent of adhering or admixed clay are present. The phosphate pebbles can advantageously be treated while they still contain a somewhat larger amount of admixed clay or clay and sand. In particular the common scrubbing action can be reduced for the purpose of conserving phosphate values and the clay balls and soft sand rock remaining because of the reduced scrubbing action can advantageously and easily be removed by permitting this material to stand and soak for a period sufficiently long to disintegrate the clay balls, soft sand rock and clay after which they can be easily removed by rinsing and screening.

The spontaneous disintegration which is accomplished by the interruption and soaking treatment of the present invention makes it possible to remove the final objectionable clay balls and soft sand rock and adhering clay and sand without objectionable loss of phosphate material by the usual harsh scrubbing action. Accordingly an improved quality of grade and value is obtained without the objectionable loss of quantity due to attrition when logs, scrubbers or crushers are used. In particular the softer phosphate pebble rock which is usually of high quality, is largely retained in the final product instead of being to a considerable extent disintegrated and lost by the usual harsh scrubbing actions.

The amount of water which is present in the wet phosphate material when it is interrupted in the common process and subjected to the soaking treatment will usually be sufficient to bring about the desired disintegration of the clay balls, etc., without the supplying of additional water, and without submersion of the material in water. The phosphate material will be "dripping" with adhering water when it leaves the usual scrubbing and screening treatment. During the soaking treatment, this water penetrates or soaks into the clay balls, etc., with consequent disintegration or with such softening and loosening thereof as will permit the resulting material to be subjected to a mild rinsing or screening treatment to effect substantially complete removal of clay and sand, leaving phosphate pebbles which are substantially clay-free and sand-free.

It will thus be seen that the present invention provides an improved process for the treatment of phosphate whereby the grade of the phosphate is improved over that obtained by the usual working process as now known and generally practiced; and that this improvement in grade of the phosphate product is accomplished without the decrease in yield which would result if it were accomplished with the usual logs, scrubbers or other clay disintegrating equipment. It will further be seen that this production of an improved product without loss of yield is obtained in a simple and advantageous manner by a process in which a large part of the existing equipment can be employed but without the use of additional scrubbing treatment by an interruption of the common process at any time before drying and by substituting a soaking treatment which extends over a considerable period of time to accomplish disintegration of the clay balls, etc. without objectionable disintegration of the phosphate material after which the material is subjected to a further gentle rinsing and screening treatment to remove the disintegrated clay and sand and to give a high grade phosphate product.

In the appended claims the word "débris" is used to include material such as clay, clay balls, sand rock, sand, etc., which is a part of the matrix in which the phosphate rock is found embedded.

I claim:

1. The improvement in the treatment of phosphate rock which comprises preliminarily removing débris from a matrix or material having phosphate rock embedded therein by a wet separating process, subjecting the phosphate rock product of such process with its relatively small remnant of clay to a soaking treatment for a sufficient period of time to effect disintegration of the clay, and then subjecting the material to a washing treatment to remove the disintegrated clay from the phosphate rock.

2. The improvement in the treatment of phosphate rock which comprises preliminarily removing débris from a matrix or material having phosphate rock embedded therein by a wet separating process, subjecting the phosphate rock product of such process with its relatively small remnant of clay to a soaking treatment for a sufficient period of time to effect disintegration of the clay, then subjecting the material to a washing treatment to remove the disintegrated clay from the phosphate rock, and maintaining the material substantially free from harsh disintegrative forces throughout said steps.

3. The improvement in the treatment of phosphate rock admixed with clay in the form of small clay balls, which comprises preliminarily removing débris from a matrix or material having phosphate rock embedded therein by a wet separating process, subjecting the phosphate rock product of such process with its relatively small remnant of clay, including the clay balls, to a soaking treatment for a sufficient period of time to effect disintegration of the clay, and then subjecting the material to a washing treatment to remove the disintegrated clay from the phosphate rock.

4. The improvement in the treatment of phosphate rock which comprises preliminarily removing débris from a matrix or material having phosphate rock embedded therein by a wet separating process, subjecting the phosphate rock of such process with its relatively small remnant of clay and while still wet from said wet separating process to a soaking treatment for a sufficient period of time to effect disintegration of the clay, and then subjecting the material to a washing treatment to remove the disintegrated clay from the phosphate rock.

5. The improvement in the treatment of phosphate rock which comprises preliminarily removing débris from a matrix or material having phosphate rock embedded therein by a wet separating process, subjecting the phosphate rock of such process with its relatively small remnant of clay to a soaking treatment for a sufficient period of time to effect disintegration of the clay, subsequently subjecting the phosphate rock to a washing and screening treatment to remove the disintegrated clay from the phosphate rock, and thereafter subjecting the phosphate rock to a drying treatment.

In testimony whereof I affix my signature.

J. TREADWELL BULLWINKEL.